(12) United States Patent
Austrheim

(10) Patent No.: US 12,098,030 B2
(45) Date of Patent: Sep. 24, 2024

(54) VEHICLE LIFT FOR AN AUTOMATED STORAGE AND RETRIEVAL SYSTEM

(71) Applicant: Autostore Technology AS, Nedre Vats (NO)

(72) Inventor: Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 423 days.

(21) Appl. No.: 17/413,192

(22) PCT Filed: Dec. 11, 2019

(86) PCT No.: PCT/EP2019/084571
§ 371 (c)(1),
(2) Date: Jun. 11, 2021

(87) PCT Pub. No.: WO2020/126725
PCT Pub. Date: Jun. 25, 2020

(65) Prior Publication Data
US 2022/0041375 A1 Feb. 10, 2022

(30) Foreign Application Priority Data

Dec. 20, 2018 (NO) .................................... 20181657
Jun. 6, 2019 (NO) .................................... 20190704

(51) Int. Cl.
*B65G 1/06* (2006.01)
*B65G 1/04* (2006.01)
*B65G 1/137* (2006.01)

(52) U.S. Cl.
CPC ........... *B65G 1/065* (2013.01); *B65G 1/0464* (2013.01); *B65G 1/0478* (2013.01); *B65G 1/1375* (2013.01)

(58) Field of Classification Search
CPC .... B65G 1/0464; B65G 1/0478; B65G 1/065; B65G 1/1375
See application file for complete search history.

(56) References Cited

U.S. PATENT DOCUMENTS 11,759,826 B1 * 9/2023 Baring ................ B65G 1/1373
414/807
2014/0277693 A1 9/2014 Naylor
(Continued)

FOREIGN PATENT DOCUMENTS

| CN | 104443976 A | 3/2015 |
|---|---|---|
| CN | 104837747 A | 8/2015 |

(Continued)

OTHER PUBLICATIONS

International Search Report issued in Application No. PCT/EP2019/084571, mailed on Mar. 13, 2020 (5 pages).
(Continued)

Primary Examiner — Kaitlin S Joerger
(74) Attorney, Agent, or Firm — Baker Botts L.L.P.

(57) ABSTRACT

A container accessing station for accessing a storage container of an automated storage and retrieval system includes a housing and a vehicle lift. The housing includes an access opening, and a base opening. A human and/or robot may access contents of the storage container through the access opening. The storage container can enter the container accessing station to be presented at the access opening through the base opening. The vehicle lift is arranged to lift a delivery vehicle carrying the storage container on an upper surface of the delivery vehicle from a pickup level below the base opening up to an accessing level where the storage container is presented to be accessed through the access opening by the human and/or robot while the storage container is still being carried by the delivery vehicle.

20 Claims, 9 Drawing Sheets

Fig. 6B

(56) References Cited

U.S. PATENT DOCUMENTS

| | | |
|---|---|---|
| 2016/0272221 A1 | 9/2016 | Tasaka et al. |
| 2018/0029798 A1 | 2/2018 | Lindbo et al. |
| 2018/0305123 A1 | 10/2018 | Lert, Jr. et al. |
| 2022/0041375 A1* | 2/2022 | Austrheim ........... B65G 1/0478 |
| 2022/0194705 A1* | 6/2022 | Hatteland ............ B65G 1/0464 |
| 2023/0014506 A1* | 1/2023 | Austrheim ............ B62D 63/04 |
| 2023/0211948 A1* | 7/2023 | Austrheim ........... B65G 1/0464 414/281 |

FOREIGN PATENT DOCUMENTS

| | | |
|---|---|---|
| CN | 107428465 A | 12/2017 |
| DE | 102009017241 A1 | 10/2010 |
| DE | 102009051800 A1 | 5/2011 |
| DE | 102011014394 A1 | 9/2012 |
| DE | 102012022454 A1 | 5/2014 |
| EP | 0458021 A1 | 11/1991 |
| JP | S56-2264 A | 10/1981 |
| JP | 2015-535517 A | 12/2015 |
| JP | 2017-081657 A | 5/2017 |
| JP | 2018516824 A | 6/2018 |
| NO | 317366 B1 | 10/2004 |
| WO | 2005/077789 A1 | 8/2005 |
| WO | 2012/106746 A1 | 8/2012 |
| WO | 2014/075937 A1 | 5/2014 |
| WO | 2014072442 A1 | 5/2014 |
| WO | 2014/090684 A1 | 6/2014 |
| WO | 2015/193278 A1 | 12/2015 |
| WO | 2017/211640 A1 | 12/2017 |
| WO | 2017/220651 A1 | 12/2017 |
| WO | 2018/146304 A1 | 8/2018 |
| WO | 2018/195200 A1 | 10/2018 |

OTHER PUBLICATIONS

Written Opinion issued in International Application No. PCT/EP2019/084571, mailed on Mar. 13, 2020 (9 pages).

Search Report issued in Norwegian Application No. 20181657, mailed on Jun. 4, 2019 (2 pages).

Office Action issued in Chinese Application No. 2019800846410; Dated May 6, 2022 (8 pages).

Office Action issued in counterpart Japanese Patent Application No. 2021-534620 mailed on Feb. 2, 2024 (9 pages).

Ichinose Kaoru, Notice of Reasons for Refusal in Japanese Patent Application No. 2021-534620, Japanese Patent Office, mailed Jul. 29, 2024, 10 pages (including translation).

* cited by examiner

VEHICLE LIFT FOR AN AUTOMATED STORAGE AND RETRIEVAL SYSTEM

FIELD OF THE INVENTION

The present invention relates to an automated storage and retrieval system for storage and retrieval of containers, in particular to a vehicle lift for lifting a delivery vehicle having a storage container from a rail system into an accessing station.

BACKGROUND AND PRIOR ART

FIG. 1 discloses a typical prior art automated storage and retrieval system 1 with a framework structure 100 and FIGS. 2 and 3 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of set wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the gripping device of the container handling vehicle 301 is shown in in FIG. 3 and is indicated with reference number 304. The gripping device of the container handling device 201 is located within the vehicle body 301a in FIG. 2.

Conventionally, and also for the purpose of this application, $Z=1$ identifies the uppermost layer of storage containers, i.e. the layer immediately below the rail system 108, $Z=2$ the second layer below the rail system 108, $Z=3$ the third layer etc. In the exemplary prior art disclosed in FIG. 1, $Z=8$ identifies the lowermost, bottom layer of storage containers. Similarly, $X=1 \ldots n$ and $Y=1 \ldots n$ identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position $X=10$, $Y=2$, $Z=3$. The container handling vehicles 201,301 can be said to travel in layer $Z=0$, and each storage column 105 can be identified by its X and Y coordinates.

The storage volume of the framework structure 100 has often been referred to as a grid 104, where the possible storage positions within this grid is referred to as a storage cell. Each storage column may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves into which the wheels of the vehicles are inserted. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1 but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers positioned at or above the target position within the storage column stack 107 have been removed, the container handling vehicle 201,301 positions the storage container 106 at the desired position. The removed storage containers may then be lowered back into the storage column 105 or relocated to other storage columns.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

It is an object of the present invention to provide an effective storage and retrieval system that takes up less space on a consumer-accessible level or a human environment where a human operator can access the items in the storage container.

It is also an object of the present invention provide an automated storage and retrieval system where elements of the automated storage and retrieval system can be hidden and/or secure from the consumer-accessible level.

In some cases, there might be a desire to separate the storage grid/delivery rail environment wherein the remotely operated vehicles are operated and the human environment where a human operator can access the storage containers being a public place or consumer-accessible place, due to safety and/or space considerations, such as in a supermarket or a department store.

In other cases, there might be a desire to separate the storage grid/delivery rail environment wherein the remotely operated vehicles are operated and the human environment where a human operator can access the storage containers by e.g. providing the underground delivery rail system. The two separated environments can provide a storage grid/delivery rail environment being thermally regulated for e.g. chilled products, and/or provide a storage grid/delivery rail environment being fire containment reducing the risk of a potential fire spreading to the human environment and/or for providing noise reduction in the human environment.

Yet another object of the invention is to provide a dedicated area where storage containers and items held in the storage containers are steady when being accessed by the human operator such that there is no risk for the human operator being injured through e.g. getting an arm trapped. It is also desirable to minimise any potential damage to any picking robots that may be present to pick the items from the storage container.

Yet another object of the invention is to provide human environment for accessing storage containers which is separated from the container handling vehicles and delivery vehicles thereby providing less danger to the human operator being hit by a container handling vehicle or a delivery vehicle.

SUMMARY OF THE INVENTION

The present invention is set forth and characterized in the independent claims, while the dependent claims describe other characteristics of the invention.

In one aspect, the invention is related to a container accessing station for accessing a storage container of an automated storage and retrieval system.

The container accessing station comprises a housing which includes:
- an access opening through which a human and/or robot may access contents of the storage container; and
- a base opening through which the storage container can enter the container accessing station to be presented at the access opening, and wherein the container accessing station further comprises:
- a vehicle lift arranged to lift a delivery vehicle carrying the storage container on an upper surface of the delivery vehicle from a pickup level below the base opening up to an accessing level where the storage container is presented to be accessed through the access opening by the human and/or robot.

Thus, the storage container is presented for access at the container accessing station while the storage container is still being carried by the delivery vehicle.

In order for the storage container to pass through the base opening of the container accessing station, the perimeter of the storage container is smaller than the base opening. The same is true for the delivery vehicle allowing the delivery vehicle to pass through base opening. Further, the height of the storage container and the delivery vehicle may be close to equal the height of the housing of the container accessing station.

The vehicle lift may in an embodiment of the invention extend below the base opening a height greater than that of the delivery vehicle carrying the storage container.

The pickup level where the delivery vehicle is picked up by the vehicle lift is preferably arranged at the base of the vehicle lift.

The vehicle lift may have a lifting arrangement arranged to support the delivery vehicle and a lift mechanism for moving the lifting arrangement between the pickup level and the accessing level.

In a preferred embodiment, the vehicle lift is configured to lift the delivery vehicle carrying the storage container in a purely vertical direction between a pickup position at the pickup level and an accessing position at the accessing level. The pickup position is then arranged directly below the base opening of the container accessing station.

However, if the pickup position is spaced so far away from the base opening in the horizontal direction that a substantially vertical displacement of the lifting arrangement is not possible, the vehicle lift may have an inclined orientation i.e. have a substantial horizontal component, depending on the horizontal gap between the pickup position and the base opening of the container accessing station. The lifting arrangement would then make an inclined moving path covering the vertical and horizontal gap between the pickup position and base opening of the container accessing station. The moving path within the housing of the container accessing station, i.e. from the base opening to the access opening is however usually substantially vertical or purely vertical.

The delivery vehicle is adapted to carry the storage container above/at the upper surface of its vehicle body and may comprise a storage container carrier for receiving and supporting the storage container. The delivery vehicle may comprise at least one set of wheels enabling lateral movement of the delivery vehicle the X direction and/or Y direction, wherein the X-direction is orthogonal to the Y-direction.

In a preferred embodiment the delivery vehicle is adapted to move on a two-dimensional delivery rail system having parallel sets of rails extending in the X- and Y-direction, thus being similar to the rail system 108 discussed in the background and prior art section.

The support of lifting arrangement of the vehicle lift arranged to support the delivery vehicle may be cantilevered off the guiding structure and support the delivery vehicle from below.

In an embodiment the support may be in the form of rails configured to receive a set of driving wheels of the delivery vehicle so that the delivery vehicle can drive onto the vehicle lift at the pickup level in order to be lifted up to the accessing level. The rails may be provided as two parallel horizontally protruding arms (e.g., cantilevered) which protrude from the guiding structure of the vehicle lift to extend under one set of driving wheels of the delivery vehicle. Further, the protruding arms can be seen as an extension of the corresponding set of parallel rails of the delivery rail system when the support is positioned at the pickup level. The wheels of the delivery vehicle may engage with the rails on the support of the vehicle lift when being transported between the pickup level and the accessing level thereof.

Instead of rails, the support of the lifting arrangement may comprise a platform that extends under the base of the delivery vehicle. In an embodiment the platform may have a footprint being equal to or smaller than the footprint of the delivery vehicle.

The platform may in preferred embodiment occupy an area being less than the footprint of the delivery vehicle such that at least one set of driving wheels are arranged outside the horizontal extent of the platform when the delivery vehicle is arranged on thereon. In other words, the cross-sectional area of the platform may be less than the cross-sectional area of the footprint of the delivery vehicle, therefore, during lifting, the platform is not supporting the at least one set of driving wheels. thereby preventing the delivery vehicle from moving while it is being lifted and/or accessed.

In a more preferred embodiment of the platform, the driving wheels arranged on or within at least three of the four sides of the vehicle body are not supported by the platform thereby further preventing the delivery vehicle from moving while it is being lifted and/or accessed.

In an even more preferred embodiment of the platform, the platform is arranged on two parallel horizontally protruding arms arranged as cantilevers extending below the vehicle body such that the platform occupies an area being smaller than the footprint of the vehicle body and such that the driving wheels arranged on or within the four sides of the vehicle body are not supported by the platform.

The housing of the container accessing station may comprise a cabinet body arranged about the access opening and the base opening such that a delivery vehicle lifted into the cabinet body by the vehicle lift is shielded from the human and/or robot and only the storage container that is being carried by the delivery vehicle is accessible through the access opening. The cabinet body may provide walls between the access opening and the base opening.

The base opening may correspond to a hole in a floor that the container accessing station is positioned on.

In an embodiment of the invention, the container accessing station may comprise a cover for restricting access through the access opening when a delivery vehicle carrying a storage container is not present within the cabinet body. The cover may be a retractable cover arranged to open only when the storage container is presented at the access opening carried by the delivery vehicle.

The cover may in another embodiment restrict access when a storage container is present in the cabinet body and be provided with a lock that can only be unlocked by an authorized user for accessing the storage container. The lock may be operated by a key, or the cabinet may be provided with an ID-control e.g. passcode, finger print recognition, eye recognition, voice recognition etc. to unlock the lock by the identified authorized user.

In another example, if the container accessing station according to the invention is employed in a facility with multiple users, the users may only have access to own dedicated storage containers. The container accessing station may then be provided with an identification system both for verifying that the user requesting a specific storage container shall have access to this and that the user has access to the storage container inside the container accessing station. If the storage containers are RFID (Radio Frequency Identification) labelled, the identification system may include any means for performing identification of the storage containers such as a RFID reader arranged in connection with the container accessing station, alternatively or in addition, a reader may be arranged in connection with the container handling vehicle, for example on the vehicle lift or inside the vehicle body. This may improve security if multiple users are using the same storage and retrieval system but where each user only has access to their own storage containers.

The RFID reader can read an RFID labelled storage container, however other readers and labels are possible for identifying a storage container. As an alternative to RFID, other electromagnetic field systems (NFC), optical systems (barcode, QR code, camera reading written or engraved labels) may be used to improve security in relation to identification of storage containers.

In an embodiment of the invention, to prevent the delivery vehicle from moving off the support during transportation, the delivery vehicle may comprise a brake mechanism or locking device which can prevent the wheels from moving during transportation on the vehicle lift. The brake mechanism may comprise the wheel motor mechanism which is braked through maintaining a charge on specific stators, such that movement of the wheel(s) from the braked position is resisted by electromagnetic forces. In an embodiment, when the delivery vehicle is arranged at the pickup level, the delivery vehicle may be instructed to activate/unlock the wheels thereby allowing the delivery vehicle to exit from the vehicle lift.

In another embodiment, the lifting arrangement may comprise a securing/locking device which secures or releasably locks the delivery vehicle to the support.

In one embodiment the vehicle lift may for comprise at least one wall to protect the delivery vehicle from moving off the support during transportation. For example, the vehicle lift may comprise at least two walls which may clamp onto the sides of the delivery vehicle.

The lifting mechanism may be connected to a guiding structure of the lift device. The guiding structure may be arranged vertically between the pickup position at the pickup level and the accessing position at the accessing level thereby guiding the support in the vertical direction.

In a further embodiment the lifting mechanism may be mounted on the opposite side of the guiding structure as the support. In this way the delivery vehicle will not collide with the lifting mechanism during transportation between the pickup level and the accessing level.

In another embodiment the vehicle lift mechanism involves a rack and pinion mechanisms. The support may in this case comprise a self-climbing support.

In a second aspect, the invention concerns an automated storage and retrieval system comprising a container accessing station.

The automated storage and retrieval system comprises:
a rail system having at least a first set of parallel rails arranged in a horizontal plane P2 and extending in a first direction X, and at least a second set of parallel rails arranged in the horizontal plane P2 and extending in a second direction Y which is orthogonal to the first direction X, the first and second sets of rails together defining a grid of grid cells; and
a delivery vehicle operating on the rail system, wherein the rail system is arranged so that the delivery vehicle with the storage container can access the vehicle lift at a pickup level in order that the vehicle lift can lift the delivery vehicle and the storage container up from the pickup level to an accessing level where the storage container can be presented to be accessed through the access opening by the human and/or robot.

In an embodiment of the automated storage and retrieval system, the container accessing station is disposed on a floor above the rail system.

The delivery vehicle may advantageously have a foot print/outer perimeter equal to the size of a grid cell.

In another embodiment, the automated storage and retrieval system may comprise a plurality of container accessing stations for e.g. accessing a plurality of storage containers simultaneously or for accessing different storage containers by different users.

In a further embodiment, the automated storage and retrieval system may comprise an automated storage and retrieval framework structure comprising vertical members defining multiple storage columns for storing storage containers on top of each other in vertical stacks. The vertical members may be interconnected at their upper ends by a container handling vehicle rail system arranged to guide at least one container handling vehicle above the storage columns, the at least one container handling vehicle being configured to raise storage containers from, and lower storage containers into, the storage columns, and to transport the storage containers above the storage columns. The container handling vehicle rail system may comprise a first set of parallel rails arranged in a first horizontal plane P1 and extending in a first direction X, and a second set of parallel rails arranged in the first horizontal plane P1 and extending in a second direction Y which is orthogonal to the first direction X, which first and second sets of rails form a grid pattern in the first horizontal plane P1 comprising a plurality of adjacent container handling vehicle grid cells. Each container handling vehicle grid cell comprises a container handling vehicle grid opening defined by a pair of neighboring rails of the first set of rails and a pair of neighboring rails of the second set of rails. A transfer port column may be adapted for transport of a storage container between the container handling vehicle and a delivery space situated at a lower end of the transfer port column. Further the automated storage and retrieval system comprises the delivery rail system comprising the first delivery rail system having at least one set of parallel rails arranged in the second horizontal plane P2 guiding at least one delivery vehicle thereon. The delivery vehicle is in this embodiment adapted to receive and/or deliver a storage container at a storage container delivery location arranged on the delivery rail system below the delivery space of the transfer port column and to move from the storage container delivery location to the vehicle lift of the container accessing station.

The level of the horizontal plane P2 of delivery rail system is arranged below the base opening of the container accessing station. In one embodiment the base opening of the container accessing station may be arranged at the same level as the container handling vehicle rail system arranged in the horizontal plane P1.

In a third aspect the invention is directed to a method of presenting a storage container for allowing access to contents of the storage container through an access opening of a container accessing station by a human and/or robot, The method involves using the vehicle lift to lift the delivery vehicle carrying the storage container from a pickup level up to an accessing level and presenting the storage container on the delivery vehicle adjacent the access opening for the human and/or robot to access its contents.

The method may further comprise the step of lowering the delivery vehicle to the pickup level and optionally the step of driving the delivery vehicle off the vehicle lift and onto the delivery rail system to return the storage container to e.g. a transfer port column by moving the delivery vehicle to a storage container delivery location.

BRIEF DESCRIPTION OF THE DRAWINGS

Following drawings are appended to facilitate the understanding of the invention. The drawings show embodiments of the invention, which will now be described by way of example only, where:

In FIG. 6A the vehicle lift is ready to lift a delivery vehicle from the pickup level, while in FIG. 6B the vehicle lift has lifted the delivery vehicle from the pickup level.

DETAILED DESCRIPTION OF THE INVENTION

Figure 1:
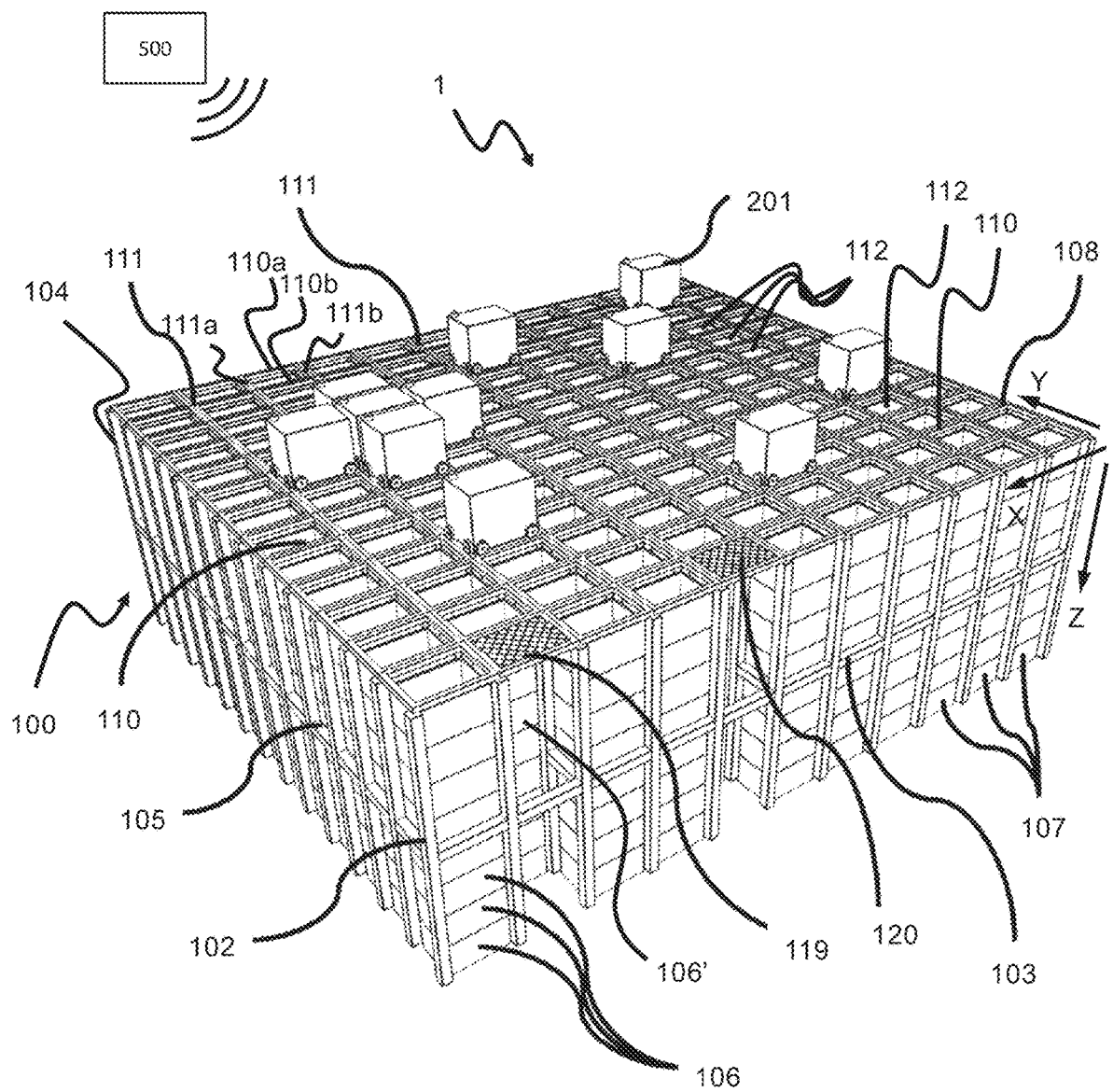
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

The framework structure 100 of the prior art automated storage and retrieval system 1 is constructed in accordance with the prior art framework structure 100 described above in connection with FIG. 1, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

Figure 2:
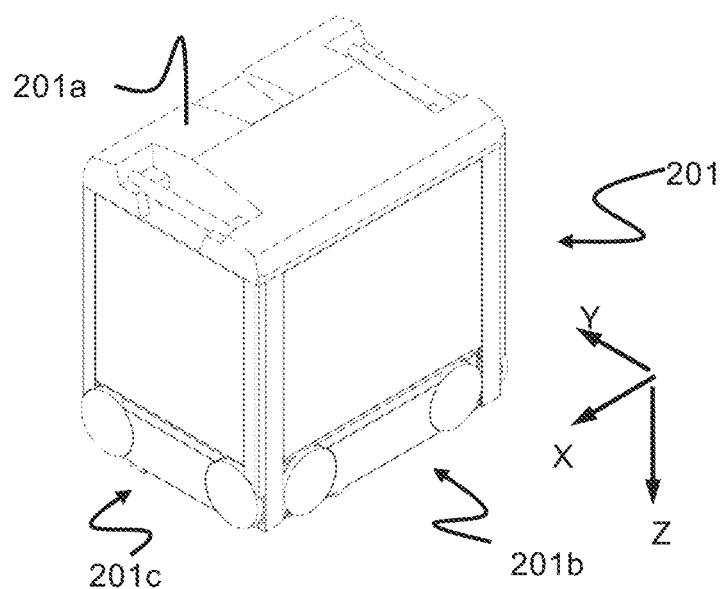
FIG. 2 is a perspective view of a prior art container handling vehicle having a centrally arranged cavity for carrying storage containers therein.
Figure 3:
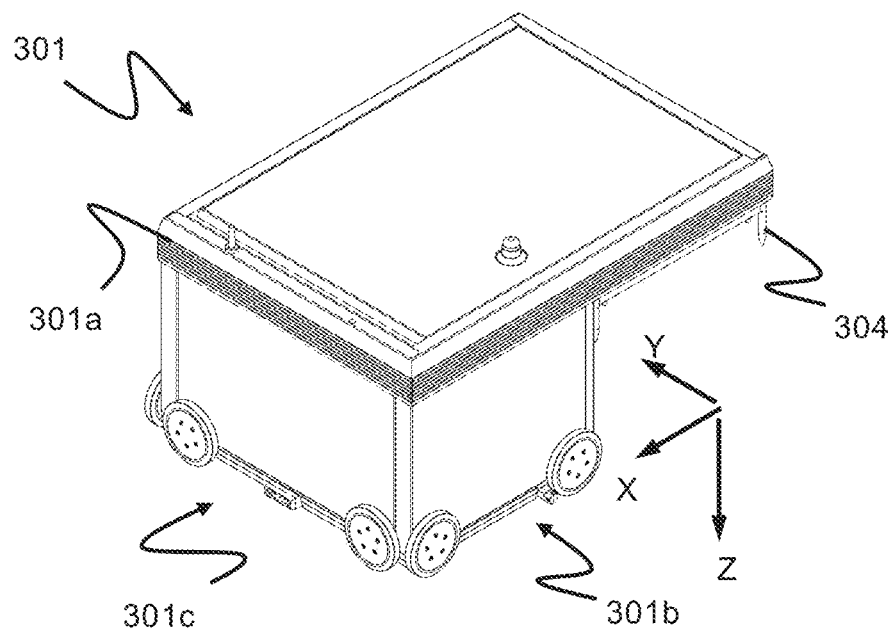
FIG. 3 is a perspective view of a prior art container handling vehicle having a cantilever for carrying storage containers underneath.

The prior art storage containers 201,301 are shown in FIGS. 2 and 3 and are described in detail in the background section of the description.

Figure 4:
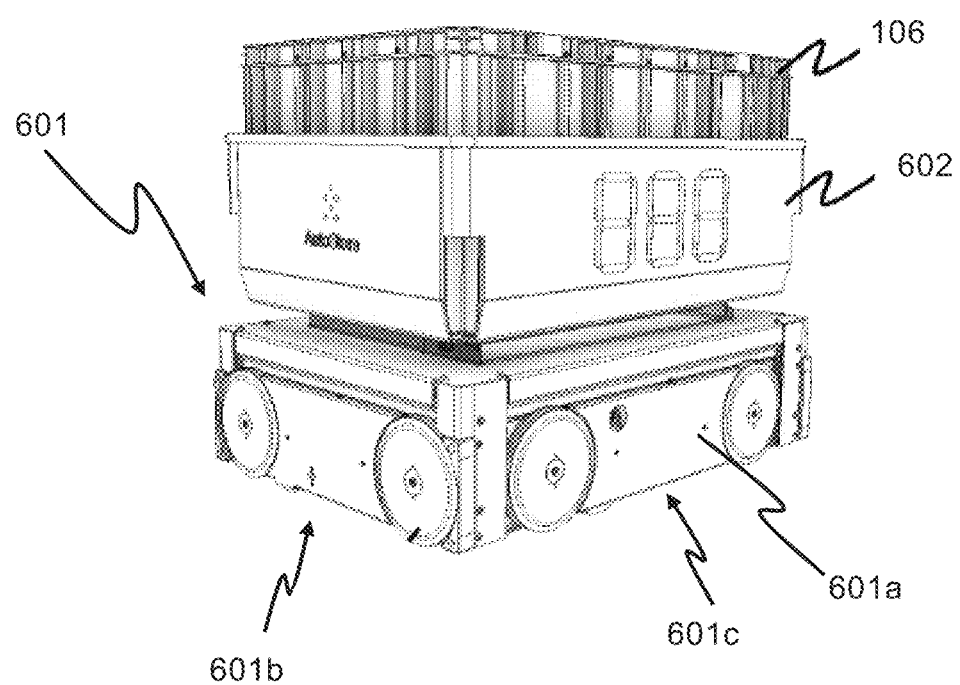
FIG. 4 is a perspective view of a delivery vehicle.

FIG. 4 shows an example of a remotely operated delivery vehicle 601 to be lifted into a container accessing station shown in FIG. 6. The delivery vehicle 601 comprises a vehicle body 601a, and first and second sets of wheels 601b,c which enable the lateral movement of the delivery vehicles 601 in the X direction and in the Y direction, respectively. Thus, each of the first and second set of driving wheels 601b,c comprises four driving wheels distributed on or within opposite sides of the vehicle body such that the delivery vehicle has two driving wheels on or within each side of the vehicle body.

The delivery vehicle 601 has a storage container carrier 602 on top of its vehicle body/chassis 601a. The storage container carrier 602 can receive the storage container 106 from the storage container handling vehicle 201,301 and the delivery vehicle is configured to deliver the storage container 106 into the container accessing station as shown in FIG. 5.

One embodiment of the automated storage and retrieval system according to the invention will now be discussed in more detail with reference to FIGS. 5 to 8.

FIG. 5 discloses a delivery rail system 608 arranged in a horizontal level, P2. The delivery rail system 608 has a first set 610 of parallel rails 610*a* arranged in the horizontal plane P2 and extending in a first direction X, and at least a second set 611 of parallel rails 611*b* arranged in the horizontal plane P2 and extending in a second direction Y which is orthogonal to the first direction X, the first and second sets of rails 610,611 together defining a grid 604 of grid cells 622 (see FIG. 9).

A plurality of delivery vehicles 601 having a periphery equal to the size of a grid cell are operating on the rail system 608 wherein each underlying rail may be a so-called double track rail comprising a pair of tracks, the rails allowing the delivery vehicles 601 to pass on all sides of an occupied grid cell.

The delivery rail system 608 is arranged so that the delivery vehicle 601 with the storage container 106 can access the vehicle lift 770 arranged at the periphery of the rail system. The vehicle lift 770 could however be arranged anywhere on the rail system 608 as long as it can be accessed by the delivery vehicle 601. The delivery vehicle 601 is picked up by the vehicle lift 770 at the pickup level 670 this being at the same level as the delivery rail system 608. The vehicle lift 770 then transports the delivery vehicle 601 from the pickup level 670 to the accessing level where the storage container 106 on the delivery vehicle can be presented to be accessed through the access opening by the human and/or robot.

FIG. 5 shows one delivery vehicle 601 at a position between the pickup level 670 and accessing level 680 and one delivery vehicle arranged on the delivery rail system 608.

The wheel assembly of the delivery vehicle, as shown in FIG. 4, comprises a first set of driving wheels 601*b* arranged to engage with two adjacent rails of the first set of rails 610, and the second set of driving wheels 601*c* arranged to engage with two adjacent rails of the second set of rails 611. At least one set of driving wheels 601*b*, 601*c* can be lifted and lowered, so that the first set of driving wheels 601*b* and/or the second set of driving wheels 601*c* can be engaged with the respective set of rails 310, 311 at any one time.

The delivery vehicle 601 may however comprise only one set of driving wheels if the delivery rail system only comprises one set of rails (not shown).

Figure 5A:
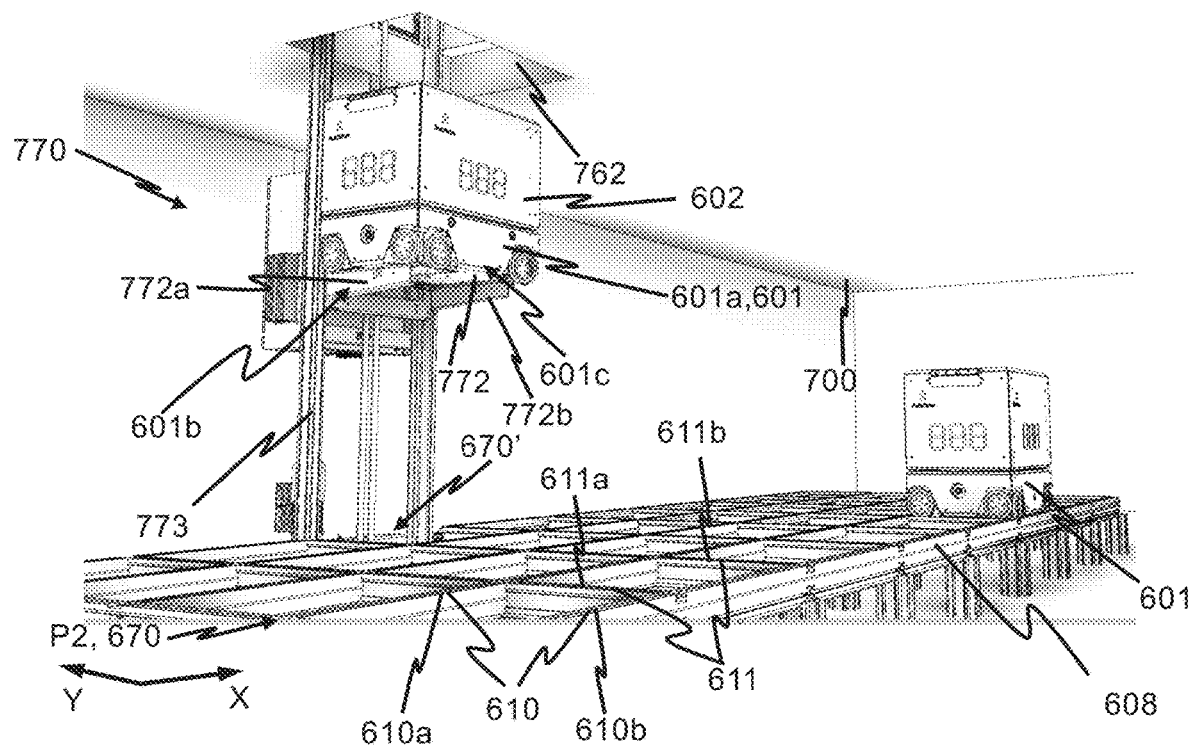
FIG. 5A and 5B are perspective view of a delivery vehicle comprising a storage container in a lifted position between a pickup level to an accessing level on a vehicle lift, and wherein the base opening of the container accessing station is visible from below.

FIG. 5A shows a support 772 in the form of a platform 772 supporting the vehicle body 601*a* of the delivery vehicle 601. The platform 772 is arranged on two parallel horizontally protruding arms 772*a*, 772*b* which protrude from the guiding structure 773. The protruding arms 772*a*,*b* are arranged as cantilevers extending below the vehicle body 601*a* such that the platform 772 occupies an area being smaller than the footprint of the vehicle body 601*a* and such that the driving wheels 601*b*,*c* which are arranged on or within the four sides of the vehicle body 601*a* are not supported by the platform 772. The platform 772 therefor occupies an area being less than the footprint of the delivery vehicle 601 such that the first and second set the driving wheels 601*b*,*c* are outside the horizontal extent of the platform 772 when the delivery vehicle 601 is arranged on the platform 772 and being lifted by the vehicle lift 770.

In this embodiment the driving wheels of the first and second set of driving wheels 601*b*,*c* of the delivery vehicle 601 are not supported by the underlying platform 772 after the delivery vehicle 601 has been lifted from the pickup position 670' thereby preventing the delivery vehicle 601 from suddenly moving while it is being lifted, since the platform 772 is holding the delivery vehicle 601 steady even if the driving wheels were to be activated by accident. Also, the only movement of the delivery vehicle 601 and therefore also the storage container 106 is in a vertical direction which poses less risk for the human getting an arm trapped when picking items from the storage container.

Figure 5B:
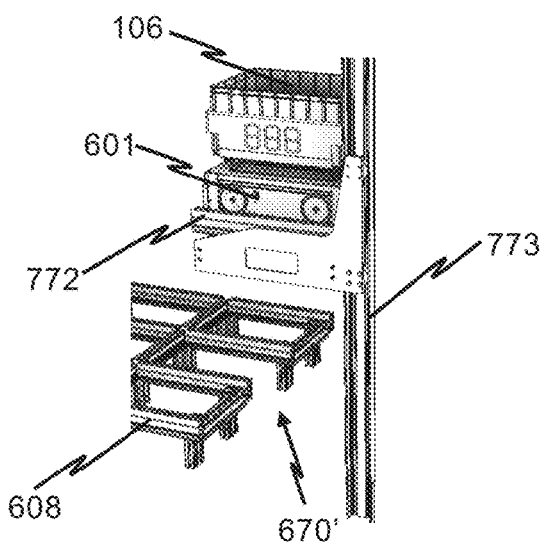

FIG. 5B further shows a support 772 comprising a pair of rails 772. The rails 772 can be seen as two parallel horizontally protruding arms arranged as cantilevers which protrude from the guiding structure 773. The guiding structure 773 is arranged vertically between the pickup position 670' at the pickup level 670 and the accessing position at the accessing level thereby being able to guide the support 772 in the vertical direction. One set of wheels 601*b*,601*c* of the delivery vehicle 601 engages with the rails 772 when the delivery vehicle 601 is moved between the pickup level 670 and the accessing level by the vehicle lift 770. The set of driving wheels may lock themselves to the rails 772 by a locking device (not shown).

The locking device may be adapted to be mounted externally from the delivery vehicle, i.e. on the support 772. The locking device may be a magnet, a spring-loaded device, a gripper, a barrier or an interacting device for interacting with the delivery vehicle 601.

For example, the locking device may comprise pins that may project from the support to interfere with the wheels to lock the delivery vehicle 601 in position. Retractable barriers such as walls may be raised or lowered keeping the delivery vehicle 601 in position or a magnetic clamp may be used.

The locking device may further be connected to an actuator for moving the locking device. The actuator may comprise an electronic, a pneumatic or a hydraulic actuator, and may produce rotational, linear or a combination of rotational and linear displacement in the locking element.

In an embodiment the locking device may be a locking bolt arranged on the support being in the form of a rail, wherein the locking bolt is interacting with delivery vehicle 601 such that the delivery vehicle 601 is locked to the rail.

The actuator and the locking bolt may be mounted on an underside support extending below the delivery vehicle 601 wherein the locking bolt, when activated, may protrude from a top surface support and into an opening provided in the delivery vehicle 601. The locking bolt of the locking device may be arranged such that the locking bolt extends into the delivery vehicle 601 opening for holding the delivery vehicle 601 in a locked position on the support.

The actuator for moving the locking bolt may comprise a moveable arm. The moveable arm when activated may lift the locking bolt from an open position (not lifted) to a locked position (lifted) such that it extends into the opening provided in the delivery vehicle 601.

The two parallel horizontally protruding arms forming the rails 772 of the support 772 are compatible with and co-operate with one set of parallel rails 611 of the delivery rail system 608 such that the protruding arms can be seen as an extension of the corresponding set of parallel rails 611 of the delivery rail system 608 when the support 772 is positioned in the pickup position 670'.

Figure 6A:
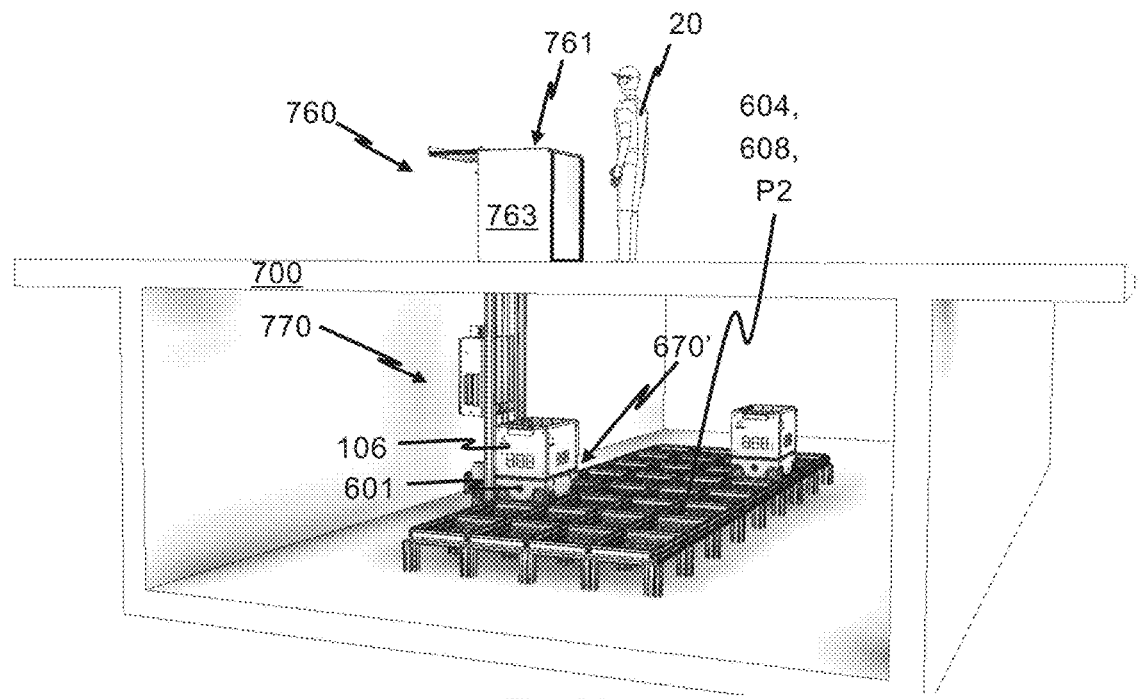
FIGS. 6A and B are perspective views of a container accessing station arranged above a delivery rail system.

When the delivery vehicle 601 is moving on the delivery rail system 608, the one set of wheels 601*c* of the delivery vehicle 601 engage with the one set of rails 611 of the delivery rail system 608, and when the delivery vehicle 601 enters the pickup position 670', the delivery vehicle 601 easily moves on to the rails 772 of the support 772 of vehicle lift 770 and the one set of wheels 601c of the delivery vehicle 601 then engages with the rails 772 of the support of the vehicle lift 770 as shown in FIG. 6A.

Figure 6B:
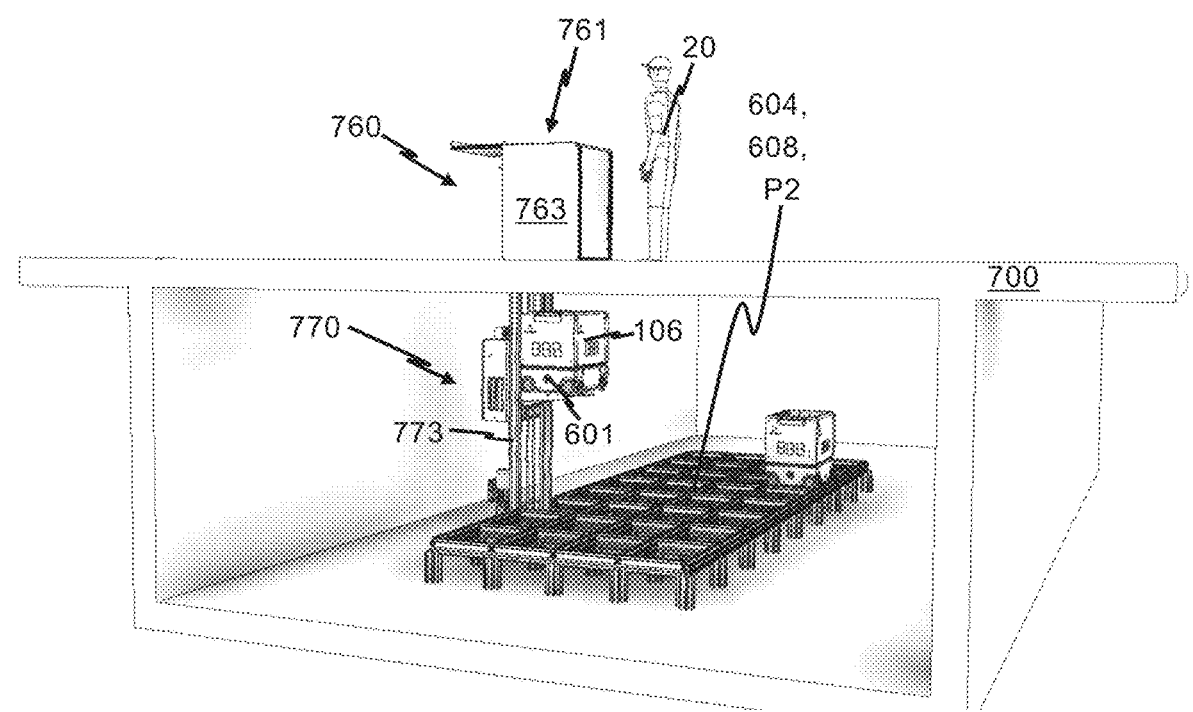

FIG. 5 is a detailed view of FIG. 6B without showing the container accessing station 760. The difference between FIGS. 6A and B is the arrangement of lifting position of the delivery vehicle 601 being arranged on the vehicle lift 770.

As mentioned above, FIG. 6A shows a delivery vehicle 601 arranged at the pickup position 670' arranged on the pickup level. The container accessing station 760 is arranged above the pickup level.

In FIG. 6B the delivery vehicle has been lifted to a position between the pickup level and the accessing level.

As shown in FIG. 5 the base opening 762 of the container accessing station corresponds to a hole in a floor 700 that the container accessing station is placed on.

The delivery vehicle 601 is lifted through the base opening 762 of the container accessing station 760 thereby entering the housing 763 and thereafter entering the accessing level of the accessing station.

Further a human operator 20 is shown being able to access the contents of the storage container 106 on the delivery vehicle 601 through the access opening 761 of the container accessing station 760.

Figure 7A:
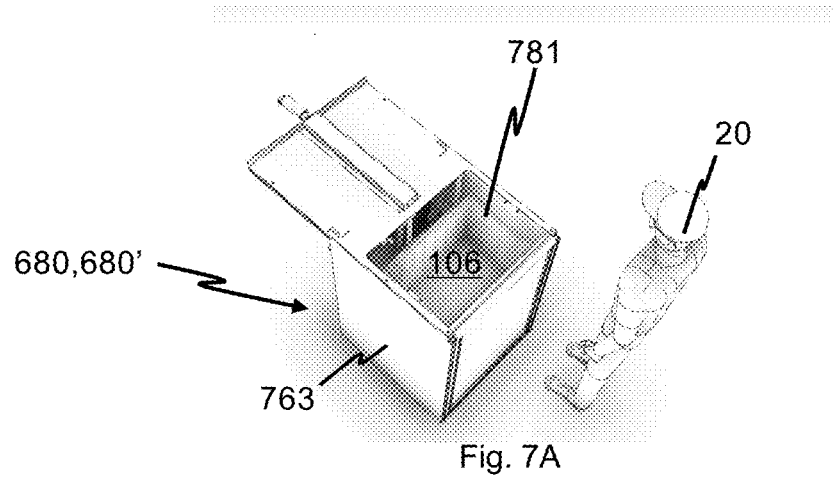
FIGS. 7A, B and C are top views of a container accessing station comprising a bin at the accessing level.
Figure 7B:
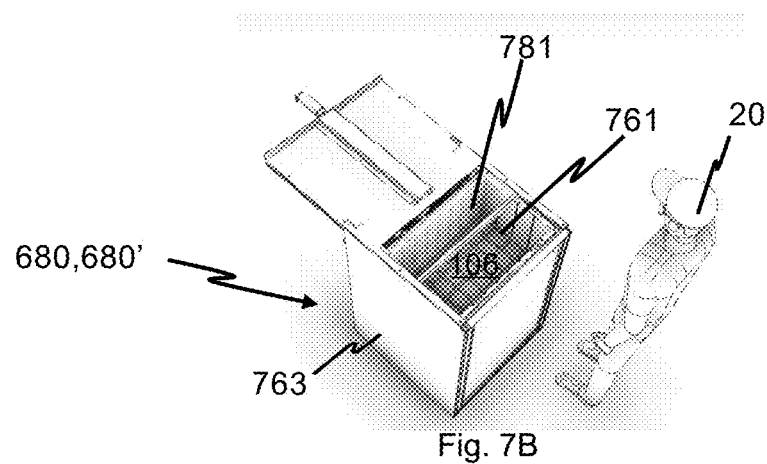
Figure 7C:
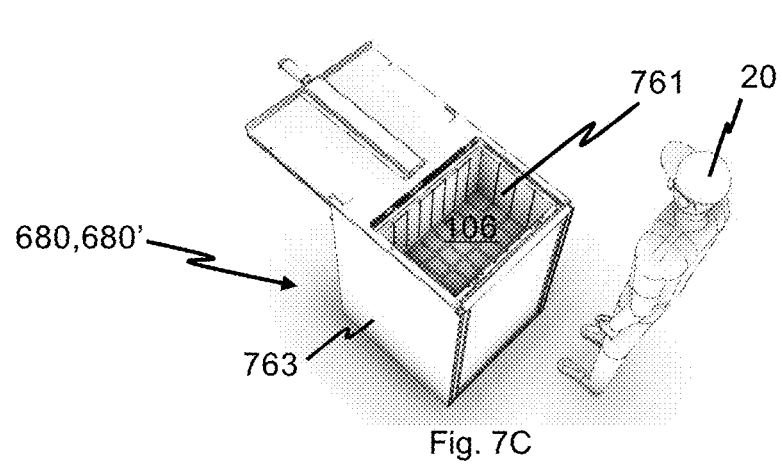

FIGS. 7A-C show the housing 763 of the container accessing station where the delivery vehicle is arranged at the accessing level 680 for the storage container 106 to be presented to the human operator 20. The access opening 761 of the housing 763 has a cover 781 for restricting access through the access opening 761. The cover 781 is retractable and arranged to open only if predetermined conditions are satisfied (e.g. if access to a container is authorised) and may thereby permit access to a container 106 through the access opening 761 when the container 106 is at the accessing level 680. The cover 781 shown in the embodiment of FIG. 7A-C is transparent allowing the contents of a storage container 106 to be viewed from outside the access opening 761. This may help speed up the picking process once the cover 781 is withdrawn from the access opening 761.

FIG. 7A shows the access opening being closed/fully covered by the cover 781.

FIG. 7B shows a partly retracted cover 781 such that the storage container can be partly accessed through the access opening 761.

FIG. 7C shows the fully opened access opening 761 where the cover has been completely retracted.

Figure 8:
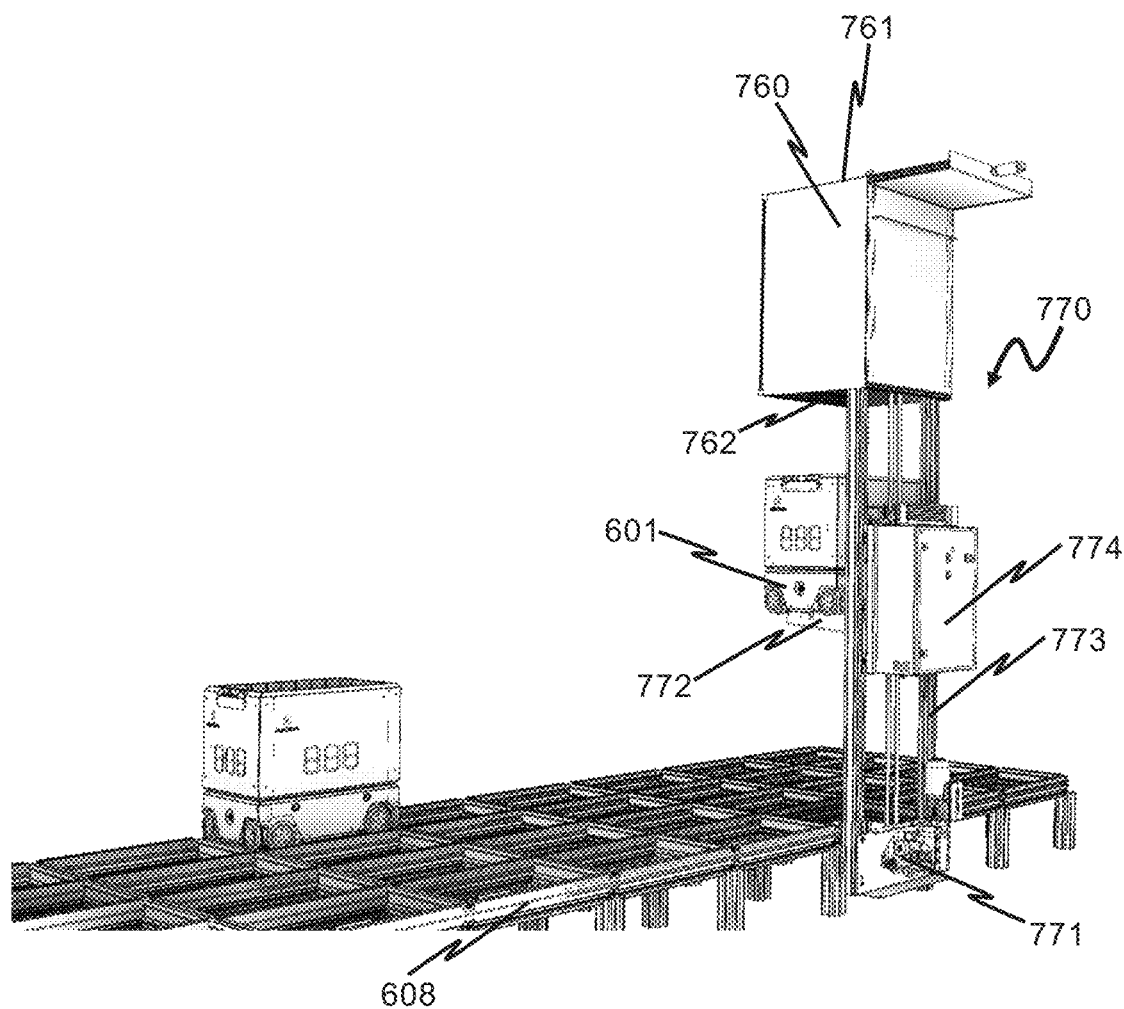
FIG. 8 is a perspective view of the vehicle lift moving the delivery vehicle between the pickup level and the accessing level.

FIG. 8 is a more detailed view of the vehicle lift 770. The lift mechanism 771 is arranged at the lower end of the guiding structure 773, where it is supported by the remainder of the delivery rail system 608, and a control box 774 is arranged on the guiding structure 773 such that it does not block the path of the support when moved along the guiding structure 773 between the pickup level and the accessing level. The control box 774 may help also to counterbalance the weight of the delivery vehicle 601 which is carrying the storage container as they are lifted up by the vehicle lift 770. In FIG. 8 the lift mechanism 771 and control box 774 are arranged on the opposite side of the guiding structure 773 as the support. The lift mechanism 771 comprises a motor for moving the support 772 in the vertical direction. The control box 774 can comprise e.g. a main switch, an emergency shutdown switch, a frequency converter and terminal blocks.

Figure 9:
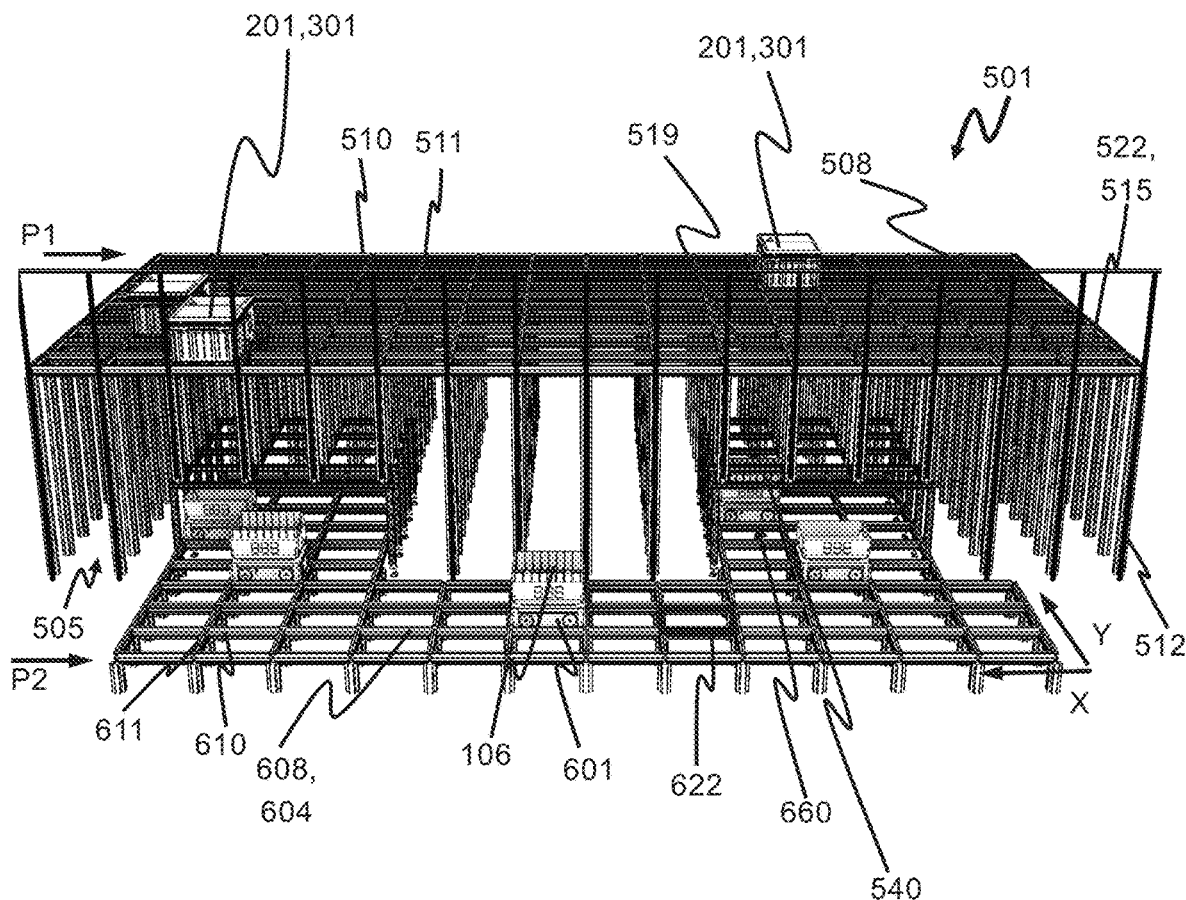
FIG. 9 is a perspective view of an automated storage and retrieval system comprising an automated storage and retrieval framework structure and a delivery vehicle system.

FIG. 9 shows an automated storage and retrieval frame structure 501 having container handling vehicles 201,301 moving on top of the frame structure 501 on top of the container handling vehicle rail system 508. The framework structure has vertical members 512 forming a plurality of storage columns 505. The storage columns 505 may store a plurality of storage containers stacked on top of each other, however these are not shown for simplicity reasons.

The container handling vehicle rail system 508 has a first set of parallel rails 510 arranged in a first horizontal plane P1 and extending in a first direction X, and a second set of parallel rails 511 arranged in the first horizontal plane P1 and extending in a second direction Y which is orthogonal to the first direction X. The first and second sets of rails 510, 511 form a grid pattern in the first horizontal plane P1 forming a plurality of adjacent grid cells 522. Each container handling vehicle grid cell 522 has a container handling vehicle grid opening 515 defined by a pair of neighboring rails of the first set of rails 510 and a pair of neighboring rails of the second set of rails 511.

The figure further shows the delivery rail system 608 constructed in a similar way as the container handling vehicle rail system 508 for the container handling vehicles 201,301.

The delivery rail system 608 has a first set of parallel rails 610 arranged in the second horizontal plane P2 and extending in a first direction X, and a second set of parallel rails 611 arranged in the second horizontal plane P2 and extending in a second direction Y which is orthogonal to the first direction X. The first and second sets of rails 610, 611 form a grid pattern in the second horizontal plane P2 forming a plurality of adjacent grid cells 622.

The first horizontal plane P1 is arranged at a higher vertical level than the second horizontal plane P2.

The delivery vehicle 601 moving on the delivery rail system 608 is adapted to receive and/or deliver storage containers 106 at a storage container delivery location 660 arranged on the delivery rail system 608 below the delivery space 540 of the transfer columns 519,520.

Figure 10:
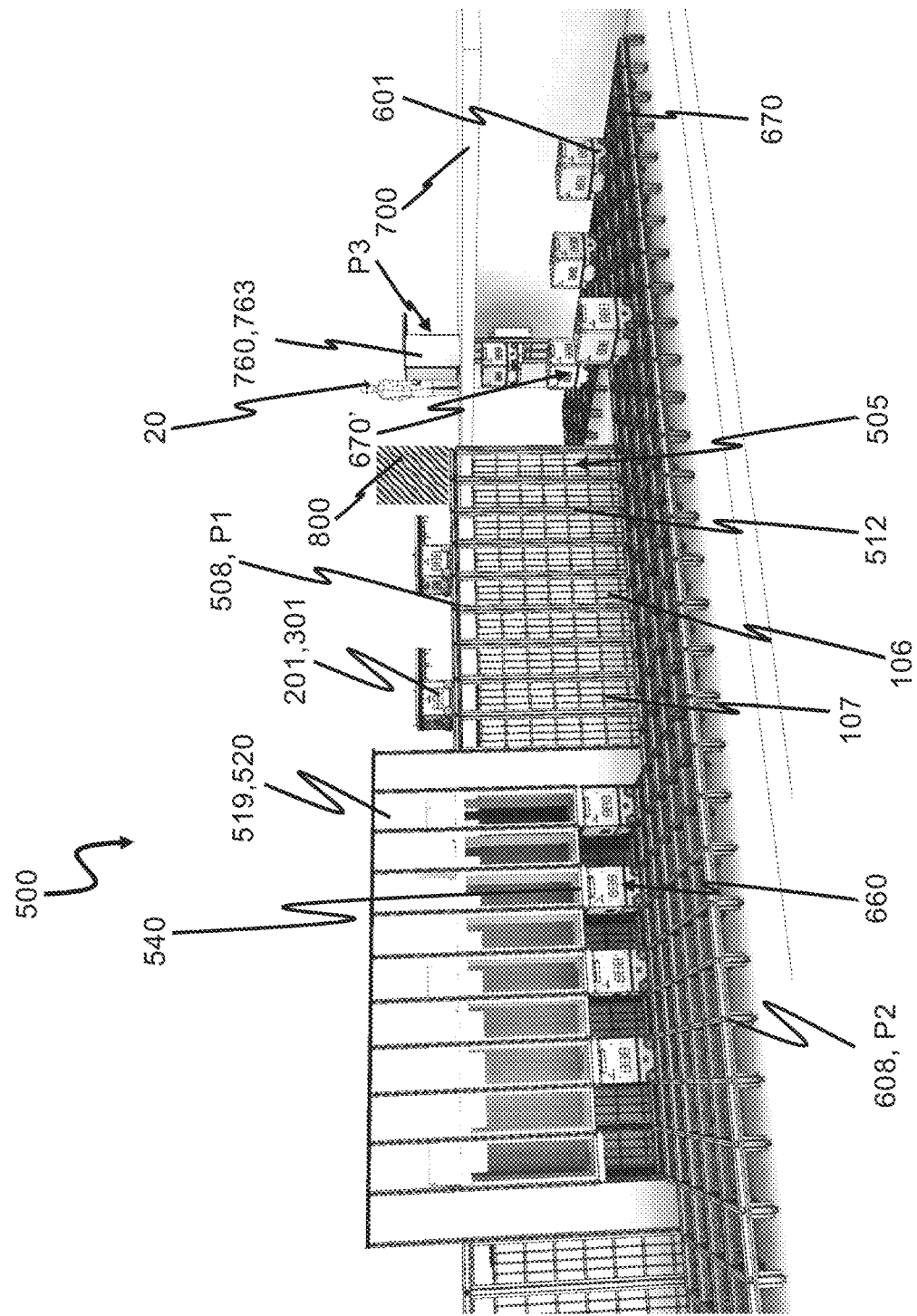
FIG. 10 is a perspective view of an automated storage and retrieval system comprising an automated storage and retrieval framework structure, a delivery vehicle system and a container accessing station.

The delivery vehicle is further configured to move from the storage container delivery location to a pickup position at the pickup level, such that delivery vehicle 601 can be lifted into the container accessing station where items held in the storage container 106 may be accessed from a different level than that of the delivery rail system 608 (see FIG. 10).

FIG. 10 shows an automated storage and retrieval framework structure similar to the one shown in FIG. 9. The figure further shows the container accessing station 760 having a housing 763 of surrounding vertically arranged walls and a top cover supported thereon. The items held in the storage containers 106 carried by the delivery vehicle 601 and lifted to the container accessing station 760 is reachable through an access opening 761 in the top cover of the housing 763.

The container accessing station 760 is arranged adjoining the container handling vehicle rail system 508 of the automated storage and retrieval framework structure 501, where the delivery rail system 608 extends from below the delivery space 540 and to a pickup position 670' located on a pickup level 670 below a container accessing station 760.

The container accessing station may be arranged at a different vertical level P3 than the first vertical level P1 of the container handling vehicle rail system 508 (not shown).

The container accessing station 760 has an access opening through which a human 20 and/or robot may access contents of the container 106. The container accessing station 760 has a base opening provided at a lower part of the housing 763, and a vehicle lift 770 arranged to retrieve a delivery vehicle 601 with the container 106 from the pickup level 670, which is beneath the base opening, and lift it up through the base opening to the accessing level so that the container 106 may be accessed through the access opening.

The container handling vehicle rail system 508 is entirely separate from the human environment wherein the human operator 20 is accessing the storage containers by a substantial warehouse wall 800 as a barrier. Further, the human operator 20 and the container accessing station 760 is disposed on a floor 700 above the rail system 608.

As shown in FIG. 7, the container accessing station 760 may comprise a cover 781 for restricting access through the access opening 761.

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

1 Automated storage and retrieval system
20 Human operator
100 Framework structure
102 Upright members of framework structure
103 Horizontal members of framework structure
104 Storage grid
105 Storage column
106 Storage container
106' Particular position of storage container
107 Stack
108 Rail system
110 Parallel rails in first direction (X)
110a First rail in first direction (X)
110b Second rail in first direction (X)
111 Parallel rail in second direction (Y)
111a First rail of second direction (Y)
111b Second rail of second direction (Y)
112 Access opening
119 First port column/drop-off port column
120 Second port column/pick-up port column
201 Prior art storage container vehicle
201a Vehicle body of the storage container vehicle 201
201b Drive means/wheel arrangement, first direction (X)
201c Drive means/wheel arrangement, second direction (Y)
301 Prior art cantilever storage container vehicle
301a Vehicle body of the storage container vehicle 301
301b Drive means/wheels in first direction (X)
301c Drive means/wheels in second direction (Y)
304 Gripping device
500 An automated storage and retrieval system
501 Framework structure of storage and retrieval system
505 Storage column of storage and retrieval system
508 Container handling vehicle transport system
510 A first set of parallel rails arranged in the horizontal direction X
511 A second set of parallel rails arranged in the horizontal direction Y
519 Transfer port column
520 Transfer port column
522 Grid cell of container handling vehicle rail system
540 Delivery port
601 Delivery vehicle
601a vehicle body/chassis of delivery vehicle 601
601b Drive means/wheel arrangement/wheel assembly, first set of wheels in the first direction (X) of delivery vehicle
601c Drive means/wheel arrangement/wheel assembly, second set of wheels in the second direction (Y) of delivery vehicle
602 Storage container carrier
604 Grid of delivery rail system
608 Delivery rail system
610 A first set of rails extending in the horizontal direction Y
610a First rail extending in a first direction X
610b Second rail extending in a first direction X
611 A second set of rails extending in the horizontal direction Y
611a First rail extending in a second direction Y
611b Second rail extending in a second direction Y
622 Grid cells of delivery rail system
660 Storage container delivery location
670 Pickup level
670' Pickup position
680 Accessing level
680' Accessing position
700 Floor
760 Container accessing station
761 Access opening
762 Base opening
763 Housing/cabinet body
770 Vehicle lift
771 Lift mechanism
772 Vehicle support
772a Horizontally protruding arm
772b Horizontally protruding arm
773 Guiding structure
774 Control box
800 Warehouse wall/barrier
P1 Horizontal plane of container handling vehicle transport system
P2 Horizontal plane of delivery rail system
P3 Horizontal plane of container accessing station
X First direction
Y Second direction
Z Third direction

The invention claimed is:

1. A container accessing station for accessing a storage container of an automated storage and retrieval system, the container accessing station comprising a housing comprising:
an access opening through which a human or robot may access contents of the storage container; and
a base opening through which the storage container can enter the container accessing station to be presented at the access opening,
and wherein the container accessing station further comprises:
a vehicle lift arranged to lift a delivery vehicle carrying the storage container on an upper surface of the delivery vehicle from a pickup level below the base opening up to an accessing level where the storage container is presented to be accessed through the access opening by the human or robot while the storage container is still being carried by the delivery vehicle, wherein the vehicle lift comprises a support of two rails wherein each rail is configured to receive one set of wheels of the delivery vehicle so that the delivery vehicle can drive onto the vehicle lift in order to be lifted up to the accessing level.

2. The container accessing station according to claim 1, wherein the vehicle lift extends below the base opening a height greater than that of the delivery vehicle carrying the storage container.

3. The container accessing station according to claim 1, wherein the vehicle lift is configured to lift the delivery vehicle carrying the storage container in a purely vertical direction between the pickup level and the accessing level.

4. The container accessing station according to claim 1, wherein the two rails comprise a locking device for preventing the one set of wheels of the delivery vehicle from moving during transportation on the vehicle lift.

5. The container accessing station according to claim 1, wherein the vehicle lift comprises a lifting support being a platform that extends under a base of the delivery vehicle.

6. The container accessing station according to claim 5, wherein the platform has a footprint being equal to or smaller than the footprint of the delivery vehicle.

7. The container accessing station according to claim 6, wherein the platform occupies an area being less than the footprint of the delivery vehicle such that at least one set of driving wheels are arranged outside a horizontal extent of the platform when the delivery vehicle is arranged thereon preventing the delivery vehicle from moving while the delivery vehicle is being lifted or accessed.

8. The container accessing station according to claim 1, wherein the vehicle lift comprises at least one wall to protect the delivery vehicle from moving off the vehicle lift during transportation.

9. The container accessing station according to claim 8, wherein the vehicle lift comprises a magnetic clamp configured to clamp onto sides of the delivery vehicle.

10. The container accessing station according to claim 1, wherein the housing further comprises a cabinet body arranged about the access opening and the base opening such that a delivery vehicle lifted into the cabinet body by the vehicle lift is shielded from the human or robot and only the storage container that is being carried by the delivery vehicle is accessible through the access opening.

11. The container accessing station according to claim 1, wherein the container accessing station comprises a cover for restricting access through the access opening when a delivery vehicle carrying a storage container is not present within a cabinet body of the housing.

12. The container accessing station according to claim 11, wherein the cover is a retractable cover arranged to open only when the storage container is presented at the access opening carried by the delivery vehicle.

13. An automated storage and retrieval system comprising a container accessing station as claimed in claim 1, and further comprising:
a delivery rail system comprising at least a first set of parallel rails arranged in a horizontal plane and extending in a first direction, and at least a second set of parallel rails arranged in the horizontal plane and extending in a second direction which is orthogonal to the first direction, the first set of parallel rails and the second set of parallel rails together defining a grid of grid cells; and
a delivery vehicle operating on the delivery rail system, wherein the delivery rail system is arranged so that the delivery vehicle with the storage container can access the vehicle lift at the pickup level in order that the vehicle lift can lift the delivery vehicle and the storage container up from the pickup level to the accessing level where the storage container can be presented to be accessed through the access opening by the human or robot while the storage container is still being carried by the delivery vehicle.

14. The automated storage and retrieval system according to claim 13, wherein the container accessing station is disposed on a floor above the delivery rail system.

15. The automated storage and retrieval system according to claim 13, wherein the delivery vehicle has a foot print equal to a size of a grid cell of the grid cells.

16. The automated storage and retrieval system according to claim 13, comprising a plurality of container accessing stations.

17. The automated storage and retrieval system according to claim 13, further comprising:
an automated storage and retrieval framework structure comprising:
vertical members defining multiple storage columns for storing storage containers on top of each other in vertical stacks,
wherein the vertical members are interconnected at their upper ends by a container handling vehicle rail system arranged to guide at least one container handling vehicle above the storage columns, the at least one container handling vehicle being configured to raise storage containers from, and lower storage containers into, the storage columns, and to transport the storage containers above the storage columns,
wherein the container handling vehicle rail system comprises a first set of parallel rails arranged in a first horizontal plane and extending in a first direction, and a second set of parallel rails arranged in the first horizontal plane and extending in a second direction which is orthogonal to the first direction, which first and second sets of rails form a grid pattern in the first horizontal plane comprising a plurality of adjacent container handling vehicle grid cells, each container handling vehicle grid cell comprising a container handling vehicle grid opening defined by a pair of neighboring rails of the first set of parallel rails and a pair of neighboring rails of the second set of parallel rails,
a transfer port column adapted for transport of a storage container between the at least one container handling vehicle and a delivery space situated at a lower end of the transfer port column,
wherein the delivery rail system is being adapted to receive or deliver a storage container at a storage container delivery location arranged on the delivery rail system below the delivery space of the transfer port column and to move from the storage container delivery location to the vehicle lift of the container accessing station.

18. A method of presenting a storage container for allowing access to contents of a storage container through an access opening of a container accessing station for accessing a storage container of an automated storage and retrieval system, the container accessing station comprising a housing comprising:
an access opening through which a human or robot may access contents of the storage container; and
a base opening through which the storage container can enter the container accessing station to be presented at the access opening, and wherein the container accessing station further comprises:

a vehicle lift arranged to lift a delivery vehicle carrying the storage container on an upper surface of the delivery vehicle from a pickup level below the base opening up to an accessing level where the storage container is presented to be accessed through the access opening by the human or robot while the storage container is still being carried by the delivery vehicle, wherein the vehicle lift comprises a support of two rails wherein each rail is configured to receive one set of wheels of the delivery vehicle so that the delivery vehicle can drive onto the vehicle lift in order to be lifted up to the accessing level, the method comprising:

using the vehicle lift to lift the delivery vehicle carrying the storage container from a pickup level up to an accessing level and presenting the storage container on the delivery vehicle at the access opening for the human or robot to access the contents while the storage container is still being carried by the delivery vehicle.

19. The method according to claim 18, wherein the method further comprises lowering the delivery vehicle to the pickup level.

20. The method according to claim 19, wherein the method further comprises removing the delivery vehicle off the vehicle lift and onto a delivery rail system to return the storage container.

\* \* \* \* \*